United States Patent Office 3,435,052
Patented Mar. 25, 1969

3,435,052
ALPHA-SUBSTITUTED BETA-PROPIOLACTONE STABILIZATION WITH ALPHA-HALOCARBOXYLIC ACIDS
Arie Klootwijk, Amsterdam, Netherlands, assignor to Shell Oil Company, New York, N.Y., a corporation of Delaware
No Drawing. Filed Mar. 4, 1966, Ser. No. 531,780
Claims priority, application Netherlands, Sept. 15, 1965, 6511986
Int. Cl. C07d 3/00
U.S. Cl. 260—343.9
8 Claims

ABSTRACT OF THE DISCLOSURE

Stabilized α-substituted β-lactone compositions, prepared by intimately contacting an α-substituted β-lactone and an α-halogenated carboxylic acid or carboxylic acid anhydride.

---

This invention relates to an improved method of stabilizing α-substituted β-lactones and to the stabilized compositions thereby obtained.

The α-substituted β-lactones are of interest as precursors of polymeric materials useful in the production of synthetic fibers. Such polymeric polyesters, when of high molecular weight, have been found to possess many interesting and desirable properties. The lactone monomers, however, are unstable and tend to polymerize during storage and transport, particularly at an elevated temperature, to form less desirable polymers of comparatively low molecular weight, thereby rendering more difficult the subsequent production of high molecular weight polymer. It therefore would be of advantage to provide a method for enhancing the stability of the lactone monomer and retarding premature polymerization. The U.S. Patent No. 3,117,980 issued Jan. 14, 1964, to Martin, discloses a method of stabilizing β-lactones by adding thereto certain nitrated phenols, e.g., picric acid. Such a procedure is not entirely satisfactory due to the known tendency of such phenols to decompose, which decomposition would lead to discoloration of the lactone monomer as well as polymers produced therefrom.

It is an object of the present invention to provide an improved method of stabilizing α-substituted β-lactones and the stabilized compositions thereby produced. More particularly, it is an object to provide stabilized compositions comprising a β-lactone substituted on the alpha carbon atom thereof with from 1 to 2 alkyl substituents, as well as to provide the method of affording stabilization.

It has now been found that these objects are accomplished by the process of intimately contacting an α-substituted β-lactone with a minor amount of an α-halogenated carboxylic acid or the carboxylic acid anhydride derived therefrom. The resulting lactone compositions are characterized by an increased stability at temperatures at or higher than those likely to be encountered during storage and transport as manifested by a greatly reduced tendency toward autopolymerization.

The α-substituted β-lactone which comprises the major component of the compositions of the invention is a β-lactone of at least one substituent other than hydrogen on the carbon atom alpha to the carboxy moiety. One class of such lactones comprises those lactones of from 4 to 10 carbon atoms represented by the formula

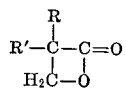

wherein R is alkyl of up to 7 carbon atoms and R' is hydrogen or R. Illustrative of such lactones are α-methyl-β-propiolactone, α-ethyl-β-propiolactone, α-butyl-β-propiolactone, α,α-dimethyl-β-propiolactone, α-methyl-α-propyl-β-propiolactone, α,α-diethyl-β-propiolactone, α-ethyl-α-tert-butyl-β-propiolactone and α-methyl-α-hexyl-β-propiolactone. In general, preferred lactones of the above formula are those wherein both R and R' are alkyl and particularly satisfactory are compositions wherein the lactone component is α,α-dimethyl-β-propiolactone.

The above-described α-substituted β-lactones are stabilized by intimately contacting the lactone with a minor proportion of an α-halogenated carboxylic acid or the carboxylic acid anhydride thereof. In terms of the α-halogenated carboxylic acids, the stabilizer comprises an otherwise hydrocarbon carboxylic acid free from acetylenic unsaturation of up to 8 carbon atoms, from 1 to 2 carboxy moieties and from 1 to 4 halogen substituents at least one of which is substituted on a carbon atom to which a carboxy moiety is also attached. The preferred carboxylic acid stabilizers are acyclic and are saturated, i.e., are alkanoic acids or alkandioic acids, or incorporate one or more, preferably one, ethylenic carbon-carbon double bonds alpha to a carboxy moiety, i.e., the acids are alkenoic acids or alkendioic acids, which are mono- or dicarboxylic acids of up to 8 total carbon atoms and from 1 to 4 halogen substituents, preferably halogen substituents of atomic number from 9 to 35 inclusive, e.g., fluorine, chlorine or bromine, wherein at least one halogen and preferably each halogen is a substituent on a carbon atom alpha to a carboxy moiety. Illustrative of such acids are trichloroacetic acid, trifluoroacetic acid, α-chlorobutyric acid, α-bromoisobutyric acid, chlorosuccinic acid, chloromaleic acid, α-chloropropionic acid, α-chloroglutaric chlorosuccinic acid, chloromaleic acid, α-chloropropionic acid, α-chloroglutaric acid, α-bromoglutaric acid and α,α,α′,α′-tetrachlorooctandioic acid.

Also suitable as stabilizers in the process of the invention are carboxylic acid anhydrides corresponding to the above-defined α-halogenated carboxylic acids. Such anhydrides are of several types, e.g., acyclic anhydrides incorporating two moieties of monocarboxylic acid as exemplified by trichloroacetic anhydride, trifluoroacetic anhydride, α-chloropropionic anhydride and α,α-dibromohexanoic anhydride, or cyclic intramolecular anhydrides of dicarboxylic acids such as chloromaleic anhydride, α-chloroglutaric anhydride, α,α′-dibromosuccinic anhydride and α,α-difluoroadipic anhydride.

In general, the preferred stabilizers are saturated α-halogenated monocarboxylic acids, i.e., α-halogenated alkanoic acids, of up to 6 carbon atoms and from 1 to 3 α-halogen substituents. A particularly effective stabilizer is α-chloropropionic acid.

The stabilizer is employed in a relatively minor amount. Effective stabilization is obtained when the amount of stabilizer employed in the lactone-containing composition is from about 0.005% mole to about 20% mole based on the total amount of composition. Amounts of stabilizer from about 0.05% mole to about 3% mole on the same basis are preferred.

The stabilized compositions are prepared by intimately contacting the lactone with the stabilizer, thereby obtaining an essentially homogeneous mixture. The precise method of obtaining intimate contact is not critical and methods such as dissolving, stirring, shaking and the like are suitable.

As previously stated, the process of the invention is useful in providing compositions comprising the α-substituted β-propiolactone which exhibit enhanced storage and thermal stability and a reduced tendency toward the autopolymerization generally exhibited by such unstabilized lactones. The stabilized compositions are polymerizable by known catalytic methods to high molecular weight polymers without appreciable detriment arising from the presence of the stabilizer, although, if desired, the stabilizer is separated from the lactone monomer by conventional methods, e.g., flash distillation or selective extraction, prior to polymerization. The stabilized lactone compositions are particularly useful in providing precursors of high molecular weight polymers due to the relatively low amount of low molecular weight polymer formed during the storage of the lactone monomer.

To more fully illustrate the improved process of the invention and the stabilized compositions thereby obtained, the following examples are provided. It should be understood that the details thereof are not to be regarded as limitations as they may be varied as will be understood by one skilled in this art.

Example I

A quantity of $\alpha$-methyl-$\alpha$-ethyl-$\beta$-propiolactone was prepared by reacting $\alpha$-bromomethyl-$\alpha$-methylbutyric acid with an equivalent amount of sodium hydroxide at ambient temperature in an aqueous medium while extracting with chloroform. The product mixture was subsequently separated by removal of the chloroform by distillation and the lactone was repeatedly distilled at reduced pressure until gas-liquid chromatographic analysis of the $\alpha$-methyl-$\alpha$-ethyl-$\beta$-propiolactone product indicated the presence of no more than 0.01% wt. of impurities.

A sample of this purified lactone was stored at room temperature. At the conclusion of two hours, 2% wt. of polymer had formed. Storage of a quantity of the lactone at 80° C. resulted in the formation of 30% wt. of polymer in two hours.

A composition was prepared by dissolving 0.8% mole of trifluoroacetic acid in the lactone product. After storage of this composition at room temperature for 100 hours, 0.01% wt. of polymer was present; storage at 80° C. for 10 hours resulted in the formation of 0.5% wt. of polymer.

Addition of 0.8% mole of trichloroacetic acid to samples of the lactone product resulted in the formation of 0.1% wt. of polymer after storage at room temperature for 100 hours and in the formation of 3.0% wt. of polymer after storage at 80° C. for 10 hours.

Example II

A quantity of $\alpha,\alpha$-dimethyl-$\beta$-propiolactone was prepared by a procedure similar to that of Example I. The product was purified to less than 0.0001% wt. of impurities detectable by gas-liquid chromatographic analysis.

A series of compositions was prepared by adding to samples of the purified $\alpha,\alpha$-dimethyl-$\beta$-propiolactone controlled amounts of various $\alpha$-halogenated acids or anhydrides. The stability of each resulting composition was determined by maintaining the composition at 80° C. and determining the time required for the formation of 0.1% wt. of polymer. The results of these determinations are shown in Table I. For purposes of comparison, the stability of the purified lactone was also determined.

TABLE I

| Added stabilizer, percent mole in composition: | Storage time, hours |
|---|---|
| None | 0.5 |
| Trifluoroacetic acid, 0.3 | 3.5 |
| $\alpha$-Bromoisobutyric acid, 0.3 | 6 |
| Chloromaleic anhydride, 0.15 | 13.5 |
| $\alpha$-Chloropropionic acid, 0.3 | 24.5 |

I claim as my invention:

1. A stabilized composition consisting essentially of (a) an $\alpha$-substituted $\beta$-lactone selected from $\alpha$-methyl-$\alpha$-ethyl-$\beta$-propiolactone and $\alpha,\alpha$-dimethyl-$\beta$-propiolactone and (b) from about 0.005% mole to about 20% mole based on the total composition of an $\alpha$-halogenated carboxylic acid or the anhydride thereof as stabilizer, said acid being an otherwise hydrocarbon acid of up to 8 carbon atoms, of from 1 to 2 carboxy groups, of from 0 to 1 ethylenic carbon-carbon double bonds alpha to a carboxy moiety and of from 1 to 4 halogen substituents independently of atomic number from 9 to 35 inclusive at least one of which is a substituent on a carbon atom alpha to a carboxy group.

2. The composition of claim 1 wherein the acid is an acyclic $\alpha$-haloalkanoic acid of up to 6 carbon atoms and of from 1 to 3$\alpha$-halogen substituents, each halogen being halogen of atomic number from 9 to 35 inclusive.

3. The composition of claim 2 wherein the lactone is $\alpha$-methyl-$\alpha$-ethyl-$\beta$-propiolactone.

4. The composition of claim 3 wherein the acid is trifluoroacetic acid.

5. The composition of claim 3 wherein the acid is trichloroacetic acid.

6. The composition of claim 2 wherein the lactone is $\alpha,\alpha$-dimethyl-$\beta$-propiolactone.

7. The composition of claim 6 wherein the acid is $\alpha$-chloropropionic acid.

8. The composition of claim 6 wherein the acid is $\alpha$-bromoisobutyric acid.

References Cited

FOREIGN PATENTS 1,189,272   3/1965   Germany.

OTHER REFERENCES

Cherdron et al.: "Polyesters From Lactones," Chemical Abstracts, 62, 13, 273c.

Carothers et al.: "Studies of Polymerization and Ring Formation X, The Reversible Polymerization of 6-Member Cyclic Esters," J. Am. Chem. Soc. 54, 761–772 (1932).

ALEX MAZEL, *Primary Examiner.*

FRANK A. MIKA, *Assistant Examiner.*

U.S. Cl. X.R.

252—407